US008088320B1

(12) United States Patent
Bedard

(10) Patent No.: US 8,088,320 B1
(45) Date of Patent: Jan. 3, 2012

(54) THERMOPLASTIC MATERIALS FOR ORTHOSES AND PROSTHESES

(76) Inventor: Gary George Bedard, San Mateo, CA (US)

( * ) Notice: Subject to any disclaimer, the term of this patent is extended or adjusted under 35 U.S.C. 154(b) by 0 days.

(21) Appl. No.: 12/901,549

(22) Filed: Oct. 10, 2010

(51) Int. Cl.
*B29C 70/00* (2006.01)
(52) U.S. Cl. .................... 264/257; 264/510; 264/553
(58) Field of Classification Search ............... 264/257, 264/510, 553
See application file for complete search history.

(56) References Cited

U.S. PATENT DOCUMENTS

| | | | |
|---|---|---|---|
| 5,312,669 | A | 5/1994 | Bedard |
| 5,741,744 | A | 4/1998 | Fitchmun |

*Primary Examiner* — Christina Johnson
*Assistant Examiner* — Saeed Huda
(74) *Attorney, Agent, or Firm* — Stephen E. Zweig

(57) ABSTRACT

Material and method for reducing creep in orthotics and prosthetics. Thermoplastic resin plies and fiber veil plies with a substantially porous structure composed of discontinuous fibers held together by small amounts of polymeric binder between the fiber contact points are consolidated under heat and pressure. This causes the resin to flow into the porous voids and the binder to dissociate from the contact points, producing a composite material with an embedded fiber veil remnant that retains the three dimensional structure of the original fiber veil. The various fibers can move freely with respect to one another at melt temperature, while the orientation of the fibers in the fiber veil remnant resists bending in all directions at lower temperatures. This composite material can then be vacuum thermoformed into at least one complex component of an orthotic device or prosthetic device, such as a complex component with a double horizon bend.

11 Claims, 7 Drawing Sheets

THERMOPLASTIC MATERIALS FOR ORTHOSES AND PROSTHESES

FIELD OF THE INVENTION

This invention relates to orthoses and prostheses, and more particularly to materials and methods to fabricate and reinforce the clinical devices with thermoplastic composite prepreg sheetstock.

BACKGROUND OF THE INVENTION

Since the early 1970s, heavy gauge thermoplastic sheetstock has been used to produce custom orthoses (orthopedic braces or appliances) and prostheses (artificial limbs) and components thereof, usually by way of a vacuum forming process. The methodology of clinical vacuum forming with thermoplastic sheetstock was first explored at numerous medical centers around the United States (Vacuum Forming of Plastics in Prosthetics and Orthotics, A. Bennett Wilson Jr., Orthotics and Prosthetics, Vol. 28, No 1, pp. 12-20, March 1974). The advent of "total contact" orthoses offered an alternative to historical leather and metal fabrication of conventional orthoses (Thermoformed Ankle-Foot Orthoses, Stills, M, Orthotics & Prosthetics, Vol. 29, No 4, pp. 41-51, December 1975).

Clinical products made in this fashion offer good durability, hypoallergenic patient contact surfaces and the ability to mold a product that is very intimate with the body segment of the patient that requires external support alignment or stabilization.

A custom orthoses (orthosis) or (prosthesis) prosthetic device (alternatively orthotic or prosthesis device, orthotic device, prosthetic device, clinical product, custom clinical product or in the plural orthoses and prostheses) is often fabricated by first making mold of the portion of the body over which the device is intended to be worn. Current practice is to cast the body part with plaster of Paris bandages or synthetic casting tapes. Once cured and removed from the body, the plaster or synthetic cast is called a negative model. To turn this into a positive model, the negative model is then dammed off and filled with a slurry of plaster of Paris, which is then allowed to harden. The negative cast is then removed from the surface of the positive model, and a plaster rendition of the body segment is provided as an unimproved positive model. The positive model is then improved for various clinical implications offering correction, alignment, stabilization and protection. The improved positive model is then used as a mold to fabricate a custom clinical product, specifically designed to fit that particular patient's body part.

The human form is a variable commodity, and changes in volume and shape with respect to growth, weight gain and underlying clinical patho-etiologies and pathomechanics which frequently occur. As a result, orthotic or prosthetic devices frequently need to be adjusted in the post delivery and patient use stage. This is usually done by a practitioner orthotist or prosthetist (i.e. an orthosis or prosthesis device expert) as the patient's body undergoes change.

In order to meet this need for easy adjustment, the custom clinical product is often fabricated using thermoplastic sheetstock. This material has certain advantages for forming orthotic or prosthetic devices because its shape can be easily adjusted by heat molding (viscoelastic remodeling) the material in the post delivery and patient use stage.

To make these adjustments, a practitioner will often make spot or isolated changes in the device through the use of a heat gun. A heat gun produces a directed stream of heated air. The delivery of the heated air can be directed to a spot in the clinical device that may be causing discomfort to the patient due to pressure and laminar sheer against the skin and underlying skeletal prominence. The heated spot can be re-contoured through viscoelastic remodeling of the thermoplastic sheetstock, with no reduction in the strength of the cooled thermoplastic material.

Orthotic fabrication is typically done under very low pressures and at temperatures that are roughly around the melt temperature of the thermoplastic material. Here, for example, thermoplastic sheetstock that has been heated to roughly melt temperature may simply be grasped by hand (using insulated gloves) at the four corners of the sheet, draped over the plaster of Paris positive mold of the body part, and deformed or reformed to fit the mold by low pressure vacuum forming. To do this low pressure (open atmosphere) vacuum forming, a vacuum is applied to the internal space between the thermoplastic sheetstock and the positive model which removes any residual air in the captured space. The force of the ambient (atmospheric) air pressure then intimately molds the thermoplastic sheetstock to the surface of the positive model. This forming process is facilitated by the fact that thermoplastic sheetstock is generally self-adhesive at melt temperature, and will seal to itself during this process, eliminating the need for any accessory adhesive for the airtight seal around the positive model. See for example, U.S. Pat. No. 2,978,376 (Hulse).

Typical thermoplastic resins used for thermoforming may include ABS, Kydex®, Lexan®, VIVAK®, TPE, PVC, polystyrene and numerous other generic and proprietary resins. Thermopolymer polyolefin resins in the form of polyethylene (PE) were first developed in 1934 by ICI in the United Kingdom. Dupont opened the first PE plant to support the war effort in 1943. Polypropylene, another polyolefin variant, became suitable for heavy gauge thermoforming in the mid 1950s. Isotatic polypropylene is the most common type of polypropylene sheetstock that is used for vacuum thermoforming.

Prior art on the construction of orthosis or prosthesis devices includes U.S. Pat. No. 1,232,899 (De Puy), U.S. Pat. No. 3,916,886 (Rogers), and U.S. Pat. No. 4,289,122 (Mason & Vuletich).

Although pure homopolymer sheetstock thus has many advantages for these applications, this material also has a number of significant disadvantages.

One disadvantage of using a pure homopolymer sheetstock for cut sheet heavy gauge vacuum thermoforming is the relative lack of sheet strength at melt temperature. Sheetstock that is heated just a small degree over the recommended temperature molding range for the particular sag strength of the specific resin formulation can undergo a sharp change from high viscosity to low viscosity, and as a result droop very quickly in the transfer from the non-stick oven tray to the positive model, forming regions of non-uniform thickness. Sheetstock that is heated just a small degree over the recommended molding temperature can undergo a sharp change from high viscosity to low viscosity, and as a result droop very quickly, due to the poor sag strength, in the transfer from the non-stick oven tray to the positive model, forming regions of non-uniform and substandard thickness.

This sharp change in viscosity is a particular problem for sheetstock made from homopolymer polypropylene and copolymer polypropylene. Overly hot thermoplastic sheetstock can rapidly stretch during the hand-held manipulation process. This can form thin regions in the material, resulting in a final product that might not be stiff enough to be suitable as a clinical device, resulting in wasted materials and effort.

Another drawback of using pure homogenous thermoplastic sheetstock is that the final orthoses and prostheses made from such un-reinforced homogeneous thermoplastic sheetstock have a tendency to further deform or reform with use. That is, although the orthoses or prosthesis may originally fit the patient well, with use the devices will further deform or reform, and gradually fit the patient less well. This gradual deformation is an example of "creep" or, for a clinical orthosis or prosthesis device, this creep can be termed "clinical creep". Thus an orthosis or prosthesis that might originally fit the patient well will, with use, end up fitting poorly.

Creep is a common characteristic of thermoplastic materials, especially semi-crystalline materials such as polypropylene and polyethylene and their variants. The polymer chains comprising the molecular structure of these resins are not chemically cross linked. As a result, the polymer chains will continue to move and allow the product to change shape over time, even when the use of the product is within the normal temperature service range for the particular resin. Creep is thus due to the natural viscoelastic properties of thermoplastic materials. Creep typically occurs in the amorphous area of the polymer chain structure and not within the crystalline area of a polyolefin resin.

Clinical creep or "creep" is thus a manifestation of the viscoelastic change that occurs in a clinical device fabricated from a thermoplastic material that will change shape due to the influence of gait forces that are applied to the device as well as the increase in temperature of the device from absorption of heat from contact with the human body. Clinical creep is a disadvantage in a lower extremity orthosis especially, because the foot and ankle complex requires the maintenance of optimal skeletal alignment, support and stabilization.

Even the patient's body heat can change the viscoelastic properties of thermoplastic sheetstock, and normal body temperature may raise the temperature of the device, which will accelerate clinical creep. The change in shape in the clinical product from clinical creep may decrease the efficiency of the device in the long term and lessen the useful life of the product. The polyolefin family of resins, which includes homopolymer polypropylene, co-polymer polypropylene and the polyethylene variants, are all very susceptible to clinical creep when used in a lower extremity orthosis.

Clinical creep is also a drawback in spinal orthoses that are utilized to stabilize or straighten the spinal column. The optimal corrective forces of a spinal orthosis will decrease as clinical creep alters that shape of the orthosis and will decrease the corrective effectiveness of the orthosis.

As in orthoses, the sockets of prostheses are susceptible to shape change due to clinical creep when fabricated using thermoplastic materials, especially polypropylene. For these sockets, such creep has made pure thermoplastic materials and fabrication virtually unsuitable for definitive, long-term use in prosthesis.

Resins are used to create many types of products in the modern world, and in areas outside of orthoses and prostheses, in order to combat creep and confer additional strength; it is common to impregnate various types of fibers into, or along with, the thermoplastic resin. These fibers resist stretching along whatever angle that the fiber is aligned, but are generally ineffective at resisting compression along whatever angle that the fiber is aligned, and they are also generally ineffective at resisting bending perpendicular to whatever angle that the fiber is aligned. For example, substrate reinforcing fibers can be impregnated with uncured or unpolymerized thermoset resin either before or after the reinforcing fibers are placed in a product mold. These reinforcing fibers can confer additional dimensional stability and robustness to the final product. This is the general principle behind fiberglass, for example, which is used for a wide variety of different applications.

Various ways to incorporate fibers into thermoplastic resins are known. These methods include U.S. Pat. No. 3,523,149 (Hartmann), US Statutory Invention Registration H1162 (Yamamoto et al.), U.S. Pat. No. 6,054,022 (Helwig et al.), U.S. Pat. No. 4,478,771 (Schreiber), U.S. Pat. No. 5,071,608 (Smith et al.), U.S. Pat. No. 5,194,462 (Hirasaka et al.), and U.S. Pat. No. 5,741,744 (Fitchmun).

In one method, powdered thermoplastic resin is introduced into a woven, braided or a textile form of the continuous substrate fibers. The resulting material (often called a "prepreg" because the continuous substrate textile is pre-impregnated with the resin by the manufacturer, and then often shipped to the end user in the form of ready to use sheets or rolls) retains the textile characteristic of being "drapable". This dry powdered prepreg can then be molded under high pressure and heated in a matched two-sided mold to consolidate the fibers and resin into a finished product.

Thermoplastic prepreg sheets that contain continuous fiber reinforcement in woven or braided form are commercially available. However due to the fact that the fibers are continuous and are present in a woven or braided form, these sheets are generally quite stiff. In order to fit these stiff sheets into complex molds, typically both matched (i.e. upper and lower mold surfaces) and sturdy molds (often made of metal) and high pressure and heat are required.

Unfortunately, the molding pressures that are used in prior art thermoplastic prepreg sheets are too high for use on the temporary plaster of Paris positive models used in the fabrication of orthoses and prostheses. Thus at present, the state of the art in the orthoses and prosthetic device field is generally to form the main body of the orthoses and prostheses out of the pure homogenous thermoplastic sheetstock, and to reserve any fiber reinforcement for certain strategic regions of the orthoses and prosthesis where it is absolutely essential, as in U.S. Pat. No. 6,146,349 (Rothschild et al.) and U.S. Pat. No. 5,312,669 (Bedard).

Although there is prior art with regards to using reinforcing fibers for orthoses and prosthesis devices, such as U.S. Pat. No. 6,146,344 (Bader), U.S. Pat. No. 5,624,386 (Tailor), U.S. Pat. No. 5,693,007 (Townsend), the results are still not fully satisfactory, particularly when durable orthoses and prosthesis devices must be constructed that must conform to complex body shapes, such as a three dimensional shape with a double horizon bend. As a result, the problem of clinical creep persists, and present day orthoses and prosthesis have both a limited use lifetime and a need for continual readjustment.

BRIEF DESCRIPTION OF THE INVENTION

The invention is based, in part, upon the insight that what the orthotic and prosthetic field needs is a new type of thermoplastic prepreg composite sheet (i.e. a homopolymer or mixed polymer resin sheet with reinforcement fibers) that can be vacuformed using the relatively low pressure of open atmosphere forming. The invention is also based upon the insight that to optimize this new material, the distribution of the various reinforcement fibers will have to be precisely controlled.

On the one hand, if the reinforcement fibers are continuous (i.e. of very long length) and are arranged in the form of a typical woven textile substrate, the resulting thermoplastic prepreg composite sheet will be too stiff to be manipulated using the low pressure vacuum forming process required in order to fit the complex shapes of delicate plaster of Paris molds. This material simply will break the mold, or not adequately fit the complex shape of a typical body part. To prevent this, the fibers must be relatively discontinuous, and not be rigidly locked into a fixed position against each other, but rather must be free to move with respect to each other to at least some extent at melt temperature.

On the other hand, if the reinforcement fibers are small and discontinuous and are simply thrown into the thermoplastic resin at random, then the resulting material will likely be too flexible to combat clinical creep. That is, some length and some fiber network structure are still desirable to make the resulting material creep resistant. An additional problem may be that the small fibers protruding from the surface of the resin will irritate the patient's skin.

If the reinforcement fibers are small and discontinuous and are, for example, simply spread onto the surface of a first homopolymer resin, and a second homopolymer resin sheet placed above the fibers to form a sandwich, then the fibers may somewhat tend to resist stretching of the resulting composite sheet, but they will not sufficiently protrude into the third dimension between the two sheets, and thus will not sufficiently resist bending. Thus methods such as U.S. Pat. No. 5,741,744 (Fitchmun) which teach such a simple spreading process are generally suboptimal or inadequate for these purposes.

If, however, the reinforcement fibers can be both small and discontinuous, and form a complex three dimensional network while not being locked into a completely fixed position with respect to one another, then the resulting material will be both flexible enough to be suitable for low-pressure vacuum forming using delicate and complex shape molds, while at the same time the three dimensional network of fibers would resist both stretching and bending, and thus combat clinical creep.

To achieve this proper three dimensional network or morphology, fiber veils produced from discontinuous fibers, such as discontinuous carbon fibers, can be useful. In such fiber veils, the various discontinuous fibers are arranged in a complex three dimensional network, and are generally held together at the junction between different fibers by various polymeric binders such as PVC. If such fiber veils can be incorporated into a thermoplastic polymer resin, and the overall three dimensional shape or morphology of the fiber veil preserved while the binders between fiber junctions removed, then the resulting three dimensional fiber structure will be on the one hand able to easily conform to complex shaped molds under low pressure when the polymer is at melt temperature because the various fibers are free to move slightly relative to each other. On the other hand, when cool, the three dimensional discontinuous fiber structure will tend to resist bending and stretching at every angle, because for every angle of bending and stretching, at least some fibers in the three dimensional structure will be aligned in that particular direction, and thus will resist movement in that particular direction.

Thus in one embodiment, the invention can be a thermoplastic composite material that has the ability to undergo flow and/or draw during vacuum thermoforming so that it can be drawn from a flat sheet with a first wall thickness (often between a lower range of about 3/64 or 1/16 inches thick to an upper range of about 3/4 inches thick) into a three dimensional shape with a double horizon bend while maintaining a second wall thickness greater than a preset specification thickness. Often this preset specification will be between about 75% to 125% of the original first wall thickness. This composite may typically comprise a plurality of thermoplastic material plies, and at least one internal fiber veil remnant ply. This fiber veil remnant ply may be formed from discontinuous fibers, and it may have a morphology (three dimensional structure) derived from a heat or solvent dissociated original fiber veil composed of discontinuous fibers.

In another embodiment, the invention may be method of inhibiting clinical creep in an orthotic device or a prosthetic device. This method may comprise obtaining a plurality of thermoplastic material plies and at least one original fiber veil ply composed of discontinuous fibers. The structure of this original fiber veil ply may be maintained by a polymeric binder comprising less than 10% of the weight of the original fiber veil, so that contact points between the discontinuous fibers in the original fiber veil were originally held together by said polymeric binder, and the remainder of the original fiber veil has a substantially porous structure. Here the polymeric binder may be chosen for its ability to dissociate from these fiber contact points under heat and pressure, while preserving the overall original fiber veil orientation of the discontinuous fibers.

The plurality of thermoplastic material plies and at least one original fiber veil can then be consolidated together by, for example, using a heat press at a temperature and pressure sufficient to cause the polymeric binder to dissociate from the contact points between the discontinuous fibers, thus creating at least one fiber veil remnant. During this process, the thermoplastic material flows into the porous structure of the original fiber veil, thus producing a composite material that incorporates a fiber veil remnant. This composite material can then be vacuum thermoformed said into at least one complex component of an orthotic device or prosthetic device, such as a complex component with a three dimensional shape with a double horizon bend. When cool, this material will tend to resist bending in all directions, and thus have excellent properties for minimizing the problem of clinical creep.

DETAILED DESCRIPTION OF THE INVENTION

Figure 1:
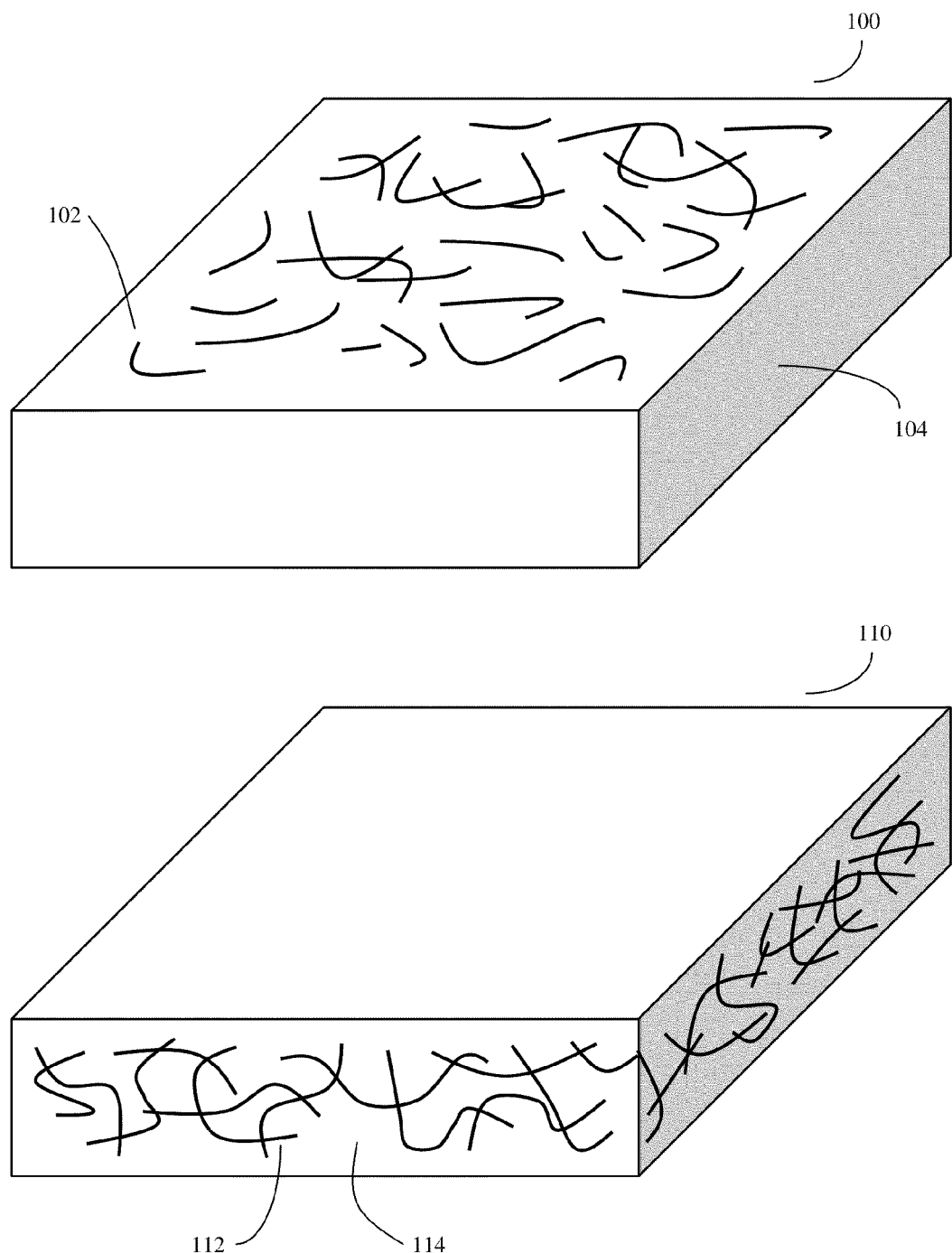
FIG. 1 shows a comparison between thermoset composite materials produced by the prior art methods of U.S. Pat. No. 5,741,744 (Fitchmun) and the present disclosure.

In some embodiments, the invention may be a material and method for reducing creep in orthoses and prostheses. Thermoplastic resin plies and fiber veil plies with a substantially porous structure composed of discontinuous fibers held together by small amounts of polymeric binder between the fiber contact points may be consolidated together under heat and pressure. This process causes the resin to flow into the fiber veil's porous voids, and the binder to dissociate from the contact points between the various discontinuous fibers in the fiber veil, producing a composite material with an embedded fiber veil remnant that generally retains the three dimensional structure of the original fiber veil. The various fibers in the fiber veil remnant can move freely with respect to one another at melt temperature, while at lower temperatures, the orientation of the fibers in the fiber veil remnant resists bending in all directions. This composite material can then be vacuum thermoformed into at least one complex component of an orthotic device or prosthetic device, such as a complex component with a double horizon bend.

In some embodiments, this invention relates to a thermoplastic sheetstock, and in particular, the use of a fiber stabilized and reinforced thermoplastic sheetstock in the fabrication of orthoses and prostheses. The improved thermoplastic sheetstock offers the ability to mold by the mobility of discontinuous reinforcement fibers within the melt-temperature thermoplastic sheetstock to flow and drape to the double compound curves of an anatomical mold, in particular to the ankle and foot region of the mold, as used in cut sheet, heavy gauge vacuum drape encapsulation thermoforming. The invention provides for an improved material and method to produce a thermoplastic sheetstock that is stabilized in part with discontinuous substrate fibers. The fiber stabilization of the thermoplastic resin is able to overcome the effects of clinical creep, improve the sag strength of the thermoplastic sheetstock at melt phase molding temperature, improve the physical characteristics of the sheetstock, and improve the ultimate physical performance of the clinical product.

The present invention also relates to a means to produce thermoplastic prepreg composite sheetstock that is suitable for heavy gauge vacuum thermoforming. Introduction of thermoplastic resin to substrate fibers is a difficult process. Thermoplastic resin, even when heated to melt stage, is still a very viscous fluid and will not easily flow into and encapsulate the reinforcement fibers. Adding thermoplastic resin to a matt of discontinuous fibers is even more difficult. The individual fibers must be held in position as the resin is added to the fiber matrix. In this new process, a thermoplastic prepreg composite sheetstock is produced that can flow when heated and conform to a male or female mold. This material may be produced in advance of use, and for example commercially sold and used by practitioners when needed.

In one embodiment, discontinuous fiber veil is layered with pre-extruded sheets of thermoplastic resin and then consolidated in a heated press.

Fiber veil is readily available on the commercial market. The standard use of the veil is primarily for use as a finish layer for composites to present a smooth cosmetic surface, and to hide under layers of woven fiber reinforcement with the associated warp and weave on the surface of the woven fibers. As an example, modern day fiberglass boat hulls are expected to have a deep gloss finish that is free of any substrate ripple. To achieve this effect, fiber veil will often be used as the layer closest to the surface or gel coat of the resin in order to block the appearance of woven fiber in the surface of the boat hull.

Discontinuous fiber veil is available in all of the common composite reinforcing and decorative fibers, including carbon fibers, glass fibers, graphite fibers, polymeric fibers, Aramide fibers and mixtures thereof. Fiber veils can also be used for a purely cosmetic benefit, whereby the fibers provide a reflective quality when used in a clear resin. The fibers used in this manner provide a metal flake type of reflective effect. Veils also are available with organic fibers such as coconut fibers, as well nano-technology fibers.

Discontinuous fiber veil is made in several proprietary means. In one example, fibers that can be in a range of 0.25 inches to several inches in length are floated in a water tank or trough. As the fibers combine into a complex three dimensional network of multi-directional fibers, the mass of fiber is suspended on a chain conveyor belt. The veil is lifted from the water is dried and a binder is applied to keep the veil in a configuration that can be handled as a textile material. The fiber veil is often made available in roll form and may have a width of 24 to 60 inches depending on the process equipment.

Several binders are used to maintain the integrity of the veil in a textile format. PVC (polyvinyl chloride) is often used as well as a polyester binder. Usually, in order to ensure that there are ample porous voids present in the fiber veil structure, only small amounts of binder, often comprising only about 4% to 7% of the total weight of the fiber veil, and generally less than 10% or 15% or 20% of the fiber veil by weight, is used.

The preferred binder is dispersed in the fiber veil so that only the contact points between the individual fibers provide a base to support the binder. The veil remains porous to allow resin to flow through and encapsulate the fibers in the consolidation process.

For the purposes of the invention described herein, because only a relatively small amount of binder is used to maintain the three dimensional morphology or textile character of the veil, this small amount of binder does not generally interfere with the physical or chemical combination of the fibers and the base thermoplastic resin. In particular, the small amounts of fiber veil binder do not hinder the melt temperature thermoplastic resin from flowing into and encapsulating the fibers during the consolidation of the invention's prepreg composite laminate.

Thus contrary to normal use, in the invention, one or more fiber veils formed from discontinuous fibers are used in sheet form as a textile substrate, and these veils are placed in a ply stack combining both various layers of plies of both extruded thermoplastic sheetstock and one or more fiber veil plies or layers. Once heat and pressure are applied to the stack, the thermoplastic resin at melt temperature flows into the porous fiber veil and both completely encapsulates the discontinuous fibers in the veil, and gently dissociates the binder from the joints between various discontinuous fibers of the fiber veil in a way that produces a fiber veil remnant that generally preserves the original three dimensional structure or morphology of the original fiber veil. The heat and pressure consolidation of the porous fiber veil(s) with the thermoplastic resin sheetstock plies or layer(s) thus produces a prepreg thermoplastic composite laminate sheetstock that is both suitable for heavy gauge vacuum thermoforming, yet highly resistant to creep under normal use.

In order for this process to work, the binder in the fiber veil should be chosen to have a relatively low temperature of disassociation, roughly comparable or less than the melt temperature of the thermoplastic plies or layers used to form the composite material. For example, the temperature that is required to flow a polyolefin resin is 295°-360° F. (146°-182° C.) for polyethylene, and 340° to 365° (F. 170° to 185° C.) for polypropylene. If the binder has a melt temperature that is less than or equal to the melt temperature of the thermoplastic plies, then the process temperature for thermoplastic melt consolidation of the ply stack will be sufficient to disassociate the binder of the fiber veil and to flow the thermoplastic resin into the discontinuous fibers of the porous veil. It is not necessary that the temperature of the dissociation of the binder in the fiber veil be exactly equal to or less than the melt temperature of the thermoplastic material, however, as long as the temperature of the dissociation of the binder in the fiber veil is nonetheless still compatible with a heat and pressure mediated consolidation process.

Thus one aspect of the invention is this use of the dissociative property of the binder forming the veil of discontinuous fibers. Although it was known in the art that some binders may solvent disassociate when in contact with various thermoset resins during the formation of a thermoset composite, it was not previously appreciated that this binder can also dissociate from the fibers merely due to the heat formation of formation of a thermoplastic composite. Surprisingly, it has been found that it is possible to use a textile version of discontinuous fiber veil that is compatible with various methods to form a thermoplastic prepreg composite sheetstock. It has also been found that this material will both allow the flow of the discontinuous fibers with the thermoplastic resin when at melt temperature, making the material highly compatible with low pressure vacuforming methods, while resisting creep at lower temperatures.

Figure 4:
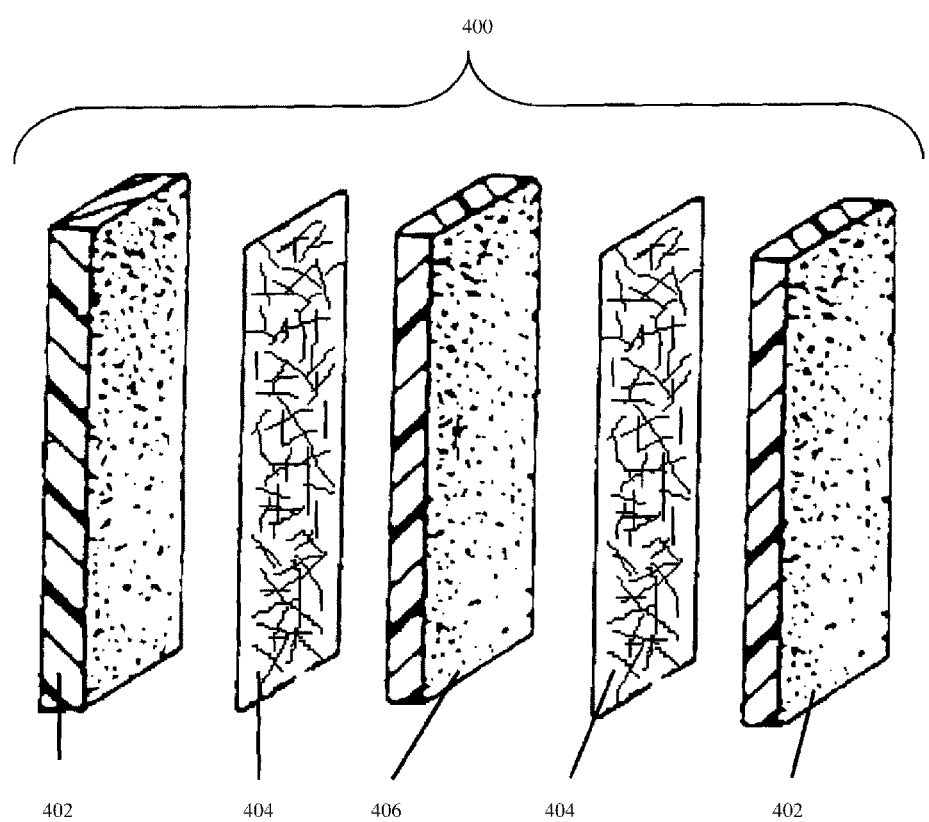
FIG. 4 illustrates a fragmentary perspective of one embodiment of this invention for a fiber stabilized and reinforced thermoplastic sheetstock. This material is compatible with the process of heavy gauge, cut sheet, draping, encapsulation, vacuum thermoforming used for the formation of orthotic and prosthetic devices.

To better contrast the differences between the material and methods of the present disclosure, and prior art methods such as U.S. Pat. No. 5,741,744 (Fitchmun), the types of structures produced by the two methods are shown in FIG. 1. In FIG. 1 (100), the distribution of various discontinuous fibers that is formed when such fibers are dropped onto the surface of a preformed roll of thermoplastic material, as per Fitchmun FIG. 4, is shown. Here please refer to Fitchmun (U.S. Pat. No. 5,741,744), the contents of which are incorporated herein by reference. In Fitchmun FIG. 4, the fibers are dropped from a chopper (Fitchmun 4(102)) onto the surface of a resin sheet (Fitchmun 4(108), 4(110)) which is then rolled up and frozen.

In the present FIG. 1, the distribution of the fibers (102) dropped onto the surface of a resin sheet (104) is shown. The fibers are generally not connected to each other, and the overall structure of the fiber network is largely two dimensional and of relatively low complexity and interweaving, being largely confined to the surface of the resin (104).

By contrast, consider the different, much more complex and three dimensional fiber orientation morphology of a composite material (110) produced according to the specification described herein. Here the various discontinuous fibers of the fiber veil remnant (112) form a complex three dimensional mesh or morphology so that a large number of fibers will be oriented in all directions, and the discontinuous fibers are generally tightly interwoven although not actually bound to each other. Because the different fibers are not actually connected to each other, as they would be in a woven continuous fiber mesh, the different fibers are free to move with respect to one another when the resin (114) is at or near its melt temperature, and thus the composite material (110) is very flexible and can be freely draped over even very complex three dimensional shapes, such as three dimensional shape with a double horizon bend, which often occurs in the production of orthotic and prosthetic devices (e.g. the ankle or heel of a foot). At the same time, once the resin has cooled, in any random direction of bend or stretch, due to the complex three dimensional morphology of the fiber veil remnant, in any given direction of stress, there will be a large number of fibers that will undergo stretching forces, and these fibers by resisting the stretching force will make the composite material stiff and resistant to clinical creep.

Thus, according to the invention, it is desirable to use a textile version of discontinuous fiber veil that is compatible with various the methods used to form a thermoplastic prepreg composite sheetstock, in particular methods that will allow the flow of the discontinuous fibers with the thermoplastic resin when at melt temperature. The heat of disassociation of the low volume veil binder allows the fibers to be fully encapsulated by the various ply layers of pre-extruded thermoplastic sheetstock. The fibers thus become fully incorporated into the resin of the sheetstock. The heat of consolidation thus eliminates any distinction between the individual components of consolidation. The distinct layers of veil ply and thermoplastic sheetstock ply become completely enmeshed as a unified structure rather than individual components. It is the low volume of the binder found only at the contact point of the individual fibers with each other that allows for the flow of the resin into the fibers. The purpose of binder is eliminated during the consolidation of the components under heat and pressure. The elimination of the binder adherence allows the fibers to thus flow with the resin when the sheetstock is subsequently used for the production of a clinical or commercial product via heavy gauge, vacuum thermoforming.

Figure 2:
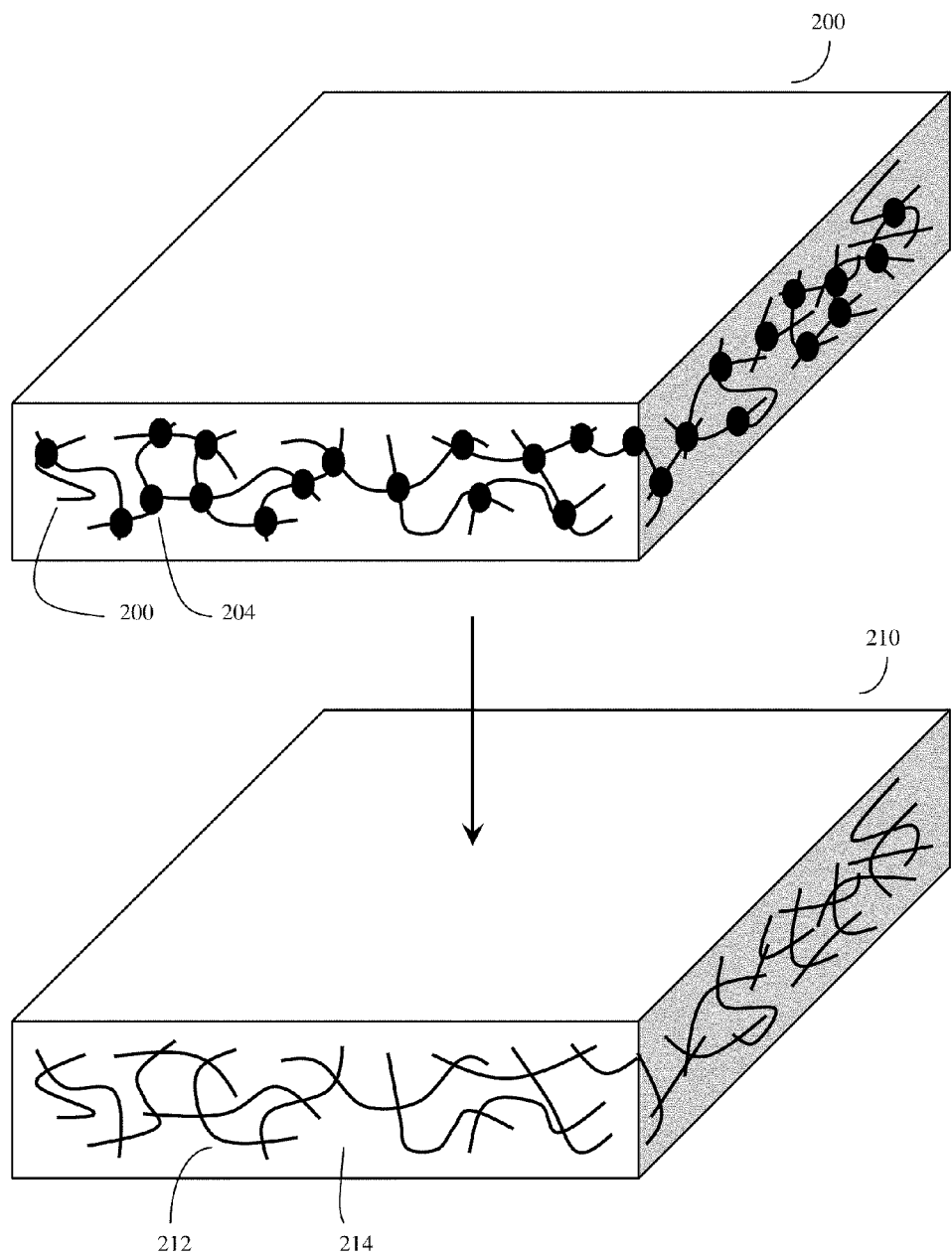
FIG. 2 shows how a fiber veil formed from discontinuous fibers and held together by a polymeric binder can be converted to a fiber veil remnant by dissociating the polymeric binder from the contact regions between discontinuous fibers using heat and pressure, while preserving the overall three dimensional structure (morphology) of the original fiber veil.

FIG. 2 shows how a fiber veil formed from discontinuous fibers and held together by a polymeric binder can be converted to a fiber veil remnant by dissociating the polymeric binder from the contact regions between discontinuous fibers using heat and pressure, while preserving the overall three dimensional structure (morphology) of the original fiber veil.

FIG. 2 (200) shows the morphology of the original fiber veil (202), in which the discontinuous fibers are held together by microscopic beads of the polymeric binder (204). In contrast, FIG. 2 (110) shows that after heat and pressure has dissociated the polymeric binder (204) from the joints between the various discontinuous fibers, forming the fiber veil remnant structure (212), the overall three dimensional structure or morphology of the fiber veil remnant structure still largely resembles that of the original intact fiber veil within the resin (214). The individual discontinuous fibers are not actually connected to each other, allowing easy movement near melt temperatures, but still form a complex meshwork that acts to resist force and stress from any direction at cooler temperatures.

Figure 3:
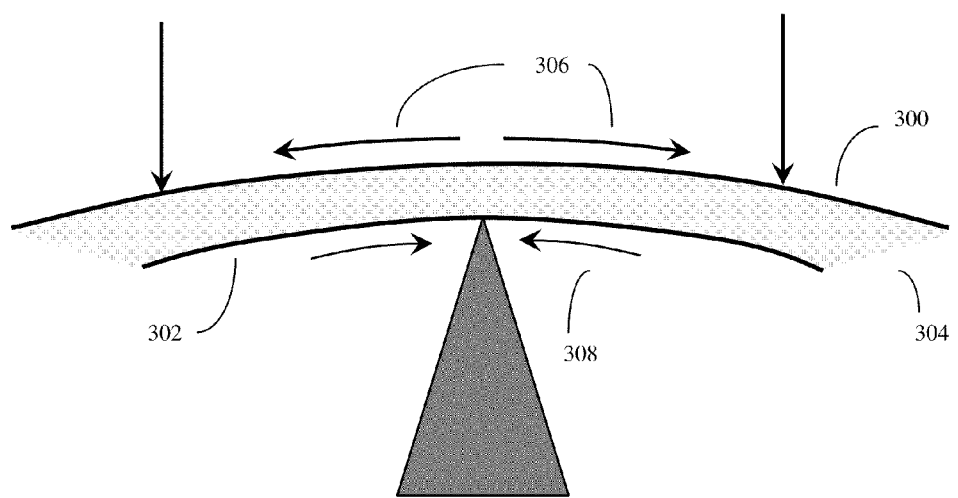
FIG. 3 is a diagram showing how fibers in a composite can resist stretching forces along the direction of a fiber, but do not resist either compression forces or forces acting perpendicular to the direction of a fiber.

FIG. 3 is a diagram showing how fibers (300), (302) in a composite material (304) can resist stretching forces along the direction of a fiber (306), but do not resist compression forces (308) and offer only small resistance to forces acting perpendicular to the direction of a fiber.

The benefit of a thermoplastic prepreg composite sheetstock that is stabilized with discontinuous fibers is the ability of the composite to be compatible with heavy gauge cut sheet vacuum thermoforming. The improved thermoplastic sheetstock offers the ability to mold by the mobility of discontinuous reinforcement fibers within the melt-temperature thermoplastic sheetstock, which allows the material to flow and drape to the double compound curves of an anatomical mold, in particular to the ankle and foot region of the mold.

In experimental trials using this new process, ply stacks have been produced with as few as three elements and with as many as seven elements. The preferred ply stack is not limited to three or seven ply, however. The ply stack can be optimized for the amount of flow that is required to fabricate a particular clinical product, which is also defined by the complexity of the compound curves in the end product.

For example, a ply stack may have four elements of homogenous thermoplastic sheetstock in a thickness of 0.0625" ($1/16^{th}$") and three elements of fiber veil. In the sheetstock sample with three elements, two plies were comprised of thermoplastic sheets and one ply element was the fiber veil. The individual plys of fiber veil in the trials have had a range of weight from 0.2 oz/yd$^2$ to 0.5 oz/yd$^2$. The trial prepreg with three elements of fiber veil has had a total veil weight of 1.5 oz/yd$^2$. The fiber veil is not limited to individual elements in the range of 0.2 oz/yd$^2$ to 0.5 oz/yd$^2$ and can be higher lower depending on the amount of flow or stabilization and reinforcement are required to product a particular end product. The thickness of the thermoplastic sheetstock can also vary with respect with the amount of flow required to produce a clinical product.

In accordance with the present invention, a thermoplastic composite sheetstock is provided that is useful in the fabrication and reinforcement of orthoses and prostheses in whole or as a component thereof.

An additional clinical benefit of the thermoplastic prepreg sheetstock that is produced with this new innovation is the elimination of fiber migration. In alternative high performance composite prepreg sheetstock that is produced using methods, fibers were usually held in a resin matrix that has a high fiber volume and a low resin volume. Indeed in these alternate methods, the fibers usually have a volume that is greater than 50% for a high performance composite. In such composites with high fiber volume and low resin volume, it is easy for the fibers to migrate to the surface. This is undesirable.

In a clinical device, exposure of these surface fiber elements can irritate the skin of the patient, which is an unacceptable outcome. For example, substrate fibers, such as carbon fiber, can easily abrade a patient's skin and create painful irritation.

By contrast, using the process and material of the invention described herein, a thick layer of resin floods the surface, and thus prevents the irritating fibers from migrating to the surface. The extra thermoplastic on the surface of the sheetstock creates a barrier protecting the patient from the discontinuous fibers, which are confined or held to the core of the sheetstock. Depending upon the desired configuration, this core can be comprised of one element of veil, or multiple elements of veil and thermoplastic sheetstock plies. The extra thermoplastic material on the surface of the sheetstock will also provide for a smooth and cosmetic surface that is free of protrusions from the discontinuous fibers that are being held in the core of the sheetstock.

As previously discussed, a moldable thermoplastic composite sheetstock that is stabilized and reinforced with discontinuous fibers is very desirable from a strength standpoint. Introducing fibers into the thermoplastic resin provides for another level of engineering capabilities over the potential of homogenous heavy gauge pure thermoplastic sheetstock. A drawback of homogenous thermoplastic sheetstock is the lack of ultimate strength for a particular device. The addition of the discontinuous fibers in the thermoplastic sheetstock transitions the sheetstock into an engineered product with selectable physical characteristics.

In a clinical orthopedic product, the fibers also inhibit creep in the material. Fibers in the resin will inhibit viscoelastic creep and prolong the effectiveness of the shape of the clinical product. The resistance to clinical creep is a benefit in both orthoses (orthopedic braces or appliances) and prostheses (artificial limbs). The benefit is also true for custom devices that are made for each patient and for off-the-shelf clinical products that are premade and available in various sizes for immediate use. The presence of discontinuous fibers in the thermoplastic resin sheetstock eliminates the need to rely on the crystalline area of the resin for resistance to clinical creep. The discontinuous fibers provide a higher degree of resistance to clinical creep as the fibers transcend the amorphous and crystalline areas of the macromolecule polymer chains.

In the consolidated format, the discontinuous fiber thermoplastic prepreg sheetstock has the ability to conform to the complex compound curves of a female or male tool. Reheating the thermoplastic prepreg sheetstock to an appropriate temperature for vacuum thermoforming will allow the resin to flow according to the inherent viscoelastic molding properties of the resin and carry the discontinuous fibers into the compound curves of the mold. Upon cooling to room temperature, the clinical product will now have the benefits of the thermoplastic resin and the structural and stabilizing properties of the substrate fibers.

Another benefit of using a thermoplastic prepreg in a thermoforming process is the ability for the material to self-adhere at melt temperature. The sheetstock material can be used an as a doubler or a regional area of double thickness to provide added structural integrity. As an example, polypropylene will adhere to itself when at melt temperature. A reinforcement coupon fabricated from the preferred sheetstock can be used as the reinforcement coupon. A reinforcement coupon that is fabricated from sheetstock that is stabilized by discontinuous fibers has the added benefit of molding to a compound curve without wrinkling. This method is an improvement to this inventor's previous invention (U.S. Pat. No. 5,312,669) of a reinforcement coupon that was consolidated with continuous fibers. The contents of U.S. Pat. No. 5,312,669 are incorporated herein by reference.

One drawback of U.S. Pat. No. 5,312,669 was that the continuous fibers used therein were relatively stiff (inextensible), and would not allow for the molding of a reinforcement coupon over a compound curve, such as the complex double horizon curves often encountered in various body structures (e.g. the heel area of an ankle foot orthosis).

By contrast, by using the preferred thermoplastic prepreg material described herein, which incorporates discontinuous fibers instead of continuous fibers, a coupon can be provided that can take the shape of the compound curves and double horizon compound curves that occur in various body structures, such as in the heel area of an ankle foot orthosis. The double compound curve required in this area of molding forms onto the sagittal, coronal and transverse planes of the device. By using the improved materials described in the invention herein, there is now an improved ability to reinforce complex shaped anatomical elements of a clinical device.

More than one type of composite thermoplastic prepreg material may be formed and used. In some cases, for example, it may be useful to formulate a base thermoplastic prepreg material with a first lower number or lower percentage of fiber veil remnants, and to formulate a reinforcement thermoplastic prepreg material with a second higher number or higher percentage of fiber veil remnants.

If this is done, then an added benefit of the improved reinforcement coupon provided by the invention described herein is that by using this coupon, orthotic and prosthetic devices can be fabricated from a preferred sheetstock composite optimized for reinforcement purposes. This reinforcement coupon material may be made with higher amounts of fiber veils or higher proportion of fiber veil weight. The higher fiber veil weight of the reinforcement coupon offers that ability to increase the structural strength of specific areas of a device, while allowing the majority of the device to be fabricated from a coupon of the first preferred sheetstock that has a lower fiber volume. This will help minimize the fiber weight in the overall device.

A particular concern in fabricating a clinical device is the ability to mold sheetstock over the heel, foot and shank of the patient's positive model. In the fabrication of an ankle foot orthosis (AFO), vacuum thermoforming of melt temperature sheetstock must allow enough draw or fluidity to accommodate the double compound curve of the foot, ankle and shank of the limb. Homopolymer polypropylene has historically been used as it does provide enough draw for the molding process. The preferred sheetstock prepreg composite described in this application will allow enough draw to form a double compound curve and form the preferred material over the three planes of molding on the sagittal, coronal and transverse planes.

The double compound curve must accommodate the plantar or, bottom aspect of the foot, partial circumference of the vertical shank of the limb, and both sides of the foot without any wrinkles occurring in section of the host material that will form the clinical device. The preferred prepreg sheetstock composite described in this application will allow forming of the host device without wrinkles in the section of the clinical device and will allow forming of a reinforcement coupon without wrinkles in the area of the selected reinforcement area.

Another benefit of the preferred prepreg thermoplastic sheetstock is the ability to consolidate the sheetstock for the exact specifications of fabricating a prosthetic socket. The standard means of fabricating an endoskeletal prosthesis is to produce a custom socket which incorporates an attachment mechanism at the distal end of the socket for connection to pre-made prosthetic components that allow for a pylon to make up the space between the prosthetic socket and the pre-made prosthetic foot. The preferred thermoplastic sheetstock would incorporate a higher concentration of fiber material in the distal area of the socket to improve the load bearing capacity of the socket in this high stress area. The distal end of the prosthetic socket requires added strength as the mechanical connector for the pylon is attached in this area.

The bulk of the prosthetic socket would not require the high structural density of the added fiber reinforcement material. The socket fabricated from the preferred thermoplastic sheetstock could also be designed to have areas of high stiffness and areas of lower stiffness to provide a dynamic relationship between the residual limb and the prosthetic socket. The areas of high and low stiffness would help to improve the comfort of the prosthetic socket for the patient.

By contrast, prior art prosthetic sockets fabricated from thermoset resins and continuous fibers are completely rigid and do not allow for such a dynamic relationship.

Also in accordance with the present invention, a clinical device, such as an orthosis or prosthesis, reinforced with the discontinuous fiber stabilized thermoplastic sheetstock, which is also fabricated from the preferred sheetstock, is provided. The host preferred sheetstock could be fabricated with a veil fiber weight that is lower than the preferred sheetstock that has a higher or greater volume or weight of discontinuous fibers. The reinforcement coupon can have greater stiffness than the preferred host sheetstock. Because the final device is not fabricated entirely from the preferred sheetstock with the higher density of fiber volume, but is only reinforced with the high-density material in the desired areas, the total weight gain due to the fiber content is minimized. The flexibility of the device may also be desired in the areas that are not reinforced.

Also in accordance with the present invention, the preferred sheetstock can be selectively reinforced with reinforcement coupon or multiple coupons that are stabilized or reinforced with fibers that are continuous through the whole area of the coupons. Reinforcement coupons, with a high degree of continuous fibers may have the ability to offer stabilization in one direction or plane and flexibility in the opposing plane. The placement of the reinforcement coupon with the continuous fiber stabilization or reinforcement could be in the forefoot area of and ankle foot orthosis. In this manner, the continuous fibers in the reinforcement coupon would be parallel to the long axis of the arch of the foot. The continuous fibers in the reinforcement coupon would offer increased stiffness to the forefoot area of an ankle foot orthosis, which would enhance the toe off portion of the gait cycle.

Also in accordance with the present invention, the preferred sheetstock can be selectively reinforced with one or more coupons placed in the posterior aspect of the shank of the limb. The continuous fibers in the coupon can then act as an integral leaf spring, offering additional benefits to the patient's gait cycle for toe off and heel strike aspects of the patient's gait.

The benefit of a thermoplastic socket fabricated from the improved prepreg laminate or composite material described herein would be to allow the use of the viscoelastic properties of the thermoplastic resin and the ability of the discontinuous fibers to move with the softened resin to accommodate a needed change in the contour of the inner socket of the prosthesis. The residual limb of a patient undergoes volume and shape changes during the course of using prosthesis. The additional benefit of contour changes allowed by use of the preferred fiber stabilized thermoplastic sheetstock will increase the service life of the prosthetic socket as well increase the comfort of the socket for the patient.

Patient compliance to the orthotic or prosthetic management regime is incumbent for a successful outcome. A benefit of the preferred embodiment of the sheetstock is the ability to use pigmented resin for the inner and outer thermoplastic resin sheetstock plies. The pigmented resin of the sheetstock can be of the same color. The pigmented resin of the outer thermoplastic resin sheetstock can also be of different colors. A benefit of the colored inner and outer plies will enhance the cosmetic appearance of the clinical device.

Another benefit of the preferred embodiment of the thermoplastic resin sheetstock ply is the ability to use an inner layer with a lower durometer of hardness. The inner layer will retain the ability to heat consolidate or thermally fuse to the inner core layer of thermoplastic resin ply. The inner thermoplastic resin sheetstock ply will be homogenous to the inner core thermoplastic resin ply and bond to the veil fibers that are between the outer and inner thermoplastic resin sheetstock plies.

Another benefit of the preferred embodiment of the thermoplastic resin sheetstock is the ability to use an inner layer that incorporates an additive for antimicrobial & antibacterial properties. Thus the skin contact surface of the device may optionally incorporate the ability to improve skin hygiene by slow time-release of these antimicrobial or antibacterial agents.

Another advantage of the resin in thermoplastic prepreg sheetstock of discontinuous fibers that the hot resin is able to bond to hot metal. This makes the thermoplastic prepreg compatible with the use of metal inserts in the injection molding process, or alternatively powder coating with thermoplastic resins.

The improved prepreg thermoplastic laminate sheetstock described herein may also be useful for other applications outside of the specific orthotic and prosthetic application contained in this application. For example, in the larger consumer and commercial marketplace, heavy gauge, cut sheet, vacuum thermoforming is utilized to fabricate a wide range of products. The same benefits that have been illustrated for the improved prepreg thermoplastic laminate sheetstock as applied in orthotics and prosthetics will serve to improve the process of fabrication and the end product of a wide range of potential consumer goods. Thus the utility of the material described herein, as well as some of the claims, are not intended to be merely limited to orthotic(s) and prosthetic application, but may apply to other applications as well.

FIG. 4 illustrates a perspective of one embodiment of this invention for a fiber stabilized and reinforced thermoplastic sheetstock (400) that is compatible with the process of heavy gauge, cut sheet, draped, encapsulation, and vacuum thermoforming. The sheetstock (400) is comprised of layers of neat or homopolymer resin (402), (406) and layers of discontinuous fiber veil mat (404). The layers (402), (404), (406) are consolidated under heat and pressure into a prepreg thermoplastic composite sheetstock (400) that can be reheated and molded into various articles with compound curves.

The neat resin layers (402), (406) can be any linear or thermoplastic resin that is able to self-bond at melt temperature. The fiber layer (404) consists of discontinuous fibers that can be comprised of carbon, fiberglass, aramind, or any reinforcing fibers such as organic fibers derived from coconut shells or fibers enhanced with nano technology. The neat resin layers (402), (406) can be of the same linear resin or compatible resins. As a decorative feature, resin layers (402) can be pigmented or colored in the same color or in multiple colors. As an example, one resin layer (402) could be colored blue, and one layer (402) could be colored blue. The outer layer (402) of a sample orthosis (500) could be in blue to appeal to a boy patient, while the outer layer (402) could be pink of an orthosis (500) to appeal to a girl patient.

The core resin layer (406) can have a thickness that is different than the outer resin layers (402). A thicker core layer (406) will improve the mechanical characteristics of the preferred sheetstock (400) by increasing the distance from the neutral axis of the prepreg composite to the reinforcing and stabilizing fiber layers (404). The outer layer (402) will also serve to protect a patient from the fiber layer (404) so there is no abrasion of the skin by the reinforcement fibers (404). The outer layers (402) will also serve to protect any article that is fabricated from the preferred sheetstock (400) from abrasion of the reinforcing fibers (404).

The preferred sheetstock (400) may consist of various layers of resin (402) and veil (404). In the simplest embodiment, the sheet stock (400) would consist of two outer layers (402) of neat resin and one fiber (404) core layer. A complex embodiment of the sheet stock (400) may consist of seven total layers in a preferred embodiment (400) with four layers of neat resin (402) and three layers of carbon veil (404). In the complex embodiment, one surface (402) of neat resin could consist of a resin that has a very low durometer. The low durometer could offer cushioning or dampening characteristics.

Figure 5:
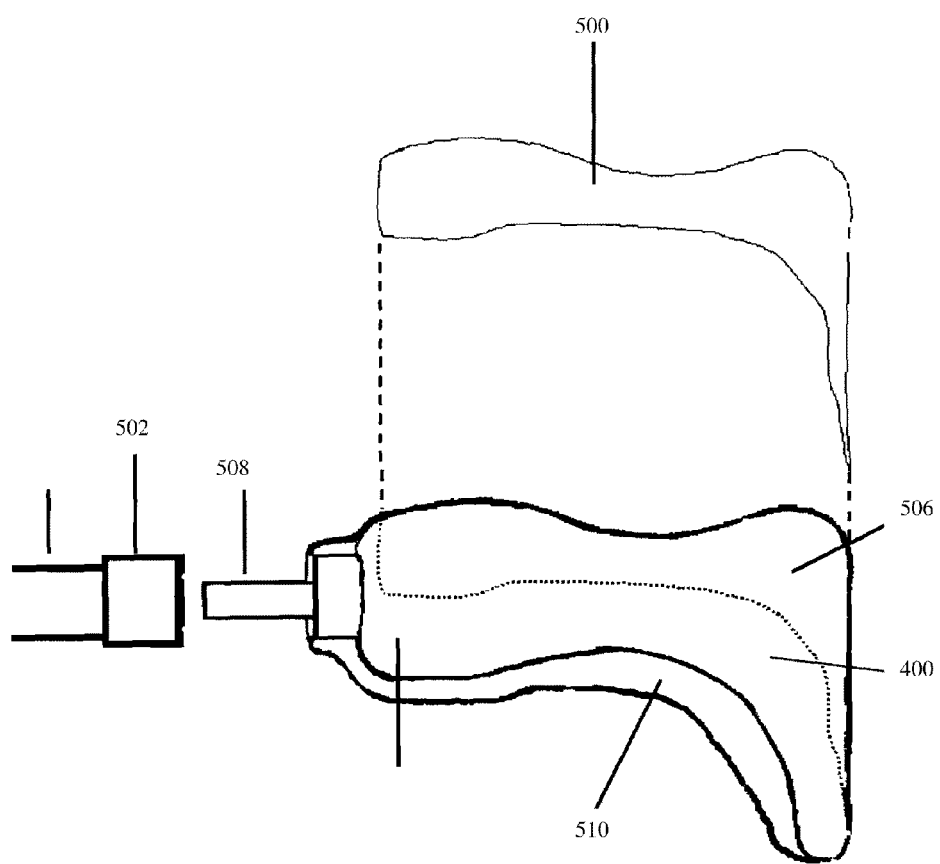
FIG. 5 illustrates the typical process and apparatus utilized to fabricate a total contact Ankle Foot Orthosis (AFO) by heavy gauge, cut sheet, draped, encapsulation, and vacuum thermoforming process.

FIG. 5 illustrates the typical process and apparatus utilized to fabricate a total contact Ankle Foot Orthosis (AFO) (500) by heavy gauge, cut sheet, draped, encapsulation, and vacuum thermoforming. Vacuum is applied through a manifold (502) to the undersurface of the preferred sheet stock (400). The preferred sheetstock (400) has been heated to melt temperature and formed over a positive model (506) of the patient's lower limb. A pipe mandrel (508) has been embedded into the plaster of Paris positive model (506) to enable the positive model (506) to be secured into the vacuum manifold (502). Once the preferred sheetstock (400) is molded over the positive model (506), a vacuum force is applied through the vacuum mandrel (502).

The preferred sheetstock (400) being self bonding at melt temperature is sealed along the bottom edge of the positive model (506) which forms a double thickness (510) of the preferred sheet stock (400). Once the preferred sheetstock (400) has cooled and stabilized, it is trimmed from the positive model (506), and provides for a rough ankle foot orthosis (AFO) (500) that is then edge finished with various power tools.

Figure 6:
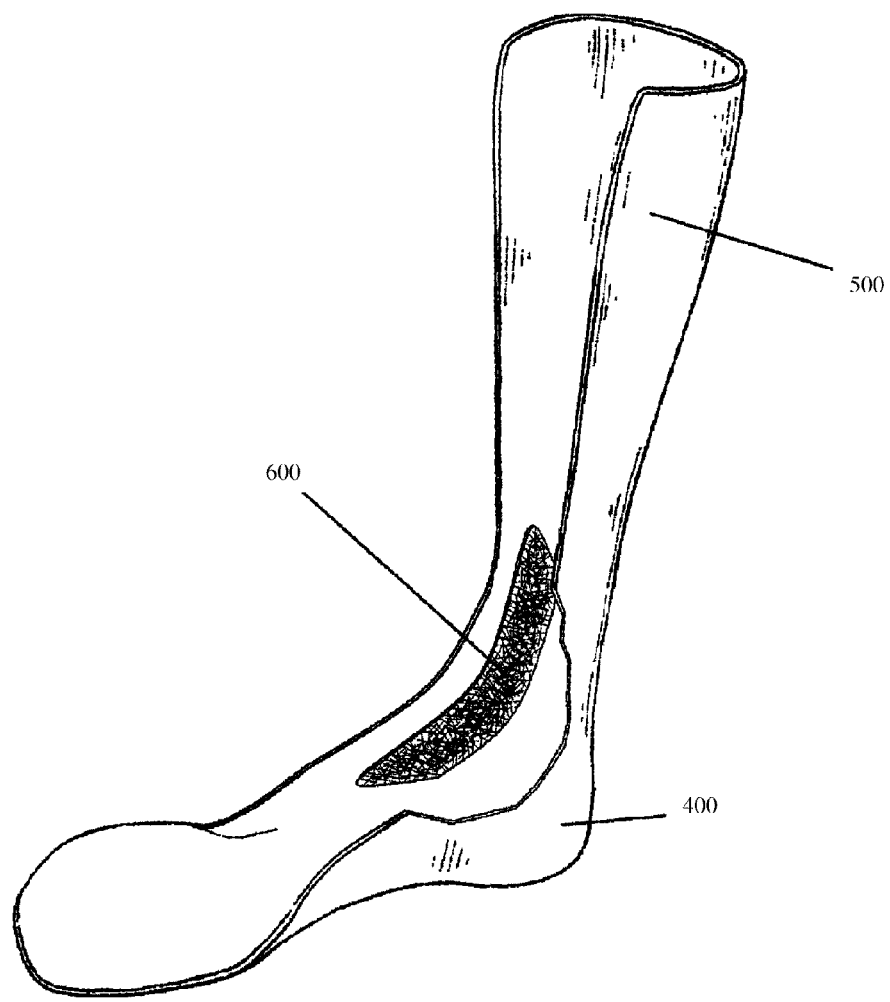
FIG. 6 is an illustration of a non-articulated Ankle Foot Orthosis (AFO).

FIG. 6 is an illustration of a non-articulated Ankle Foot Orthosis (AFO) (500). The anterior and posterior stiffness of the AFO (500), which has been vacuum thermoformed from the preferred sheetstock (400), can be enhanced through the use of an inner surface reinforcement (600). The inner surface reinforcement (600) consists of an extra layer of the preferred sheetstock (400). The inner surface reinforcement (600) can be of any shape that will enhance the stiffness of the device in any inner surface area of the device. The inner surface reinforcement can contain fiber layers (404) that are the same weight as the host preferred sheetstock (400), or the inner surface reinforcement (600) can consist of a preferred sheetstock (400) that has fiber layers (404) of a higher fiber density. In this manner, extra reinforcement is limited to high stress areas of the device, and thus minimizing the overall weigh of the device by not requiring a heavier weight fiber layer (404) to be used for the whole device.

The inner surface reinforcement (600) is applied during the vacuum forming process. The inner surface reinforcement (600) being of the same neat resin as the preferred sheetstock (400), will bond at melt temperature when host preferred sheetstock (400) and the inner surface reinforcement (600) is all heated to melt temperature in preparation of molding during the vacuum thermoforming process. No adhesive is required for the bond between the inner surface reinforcement (600) and the host preferred sheetstock (400).

Figure 7:
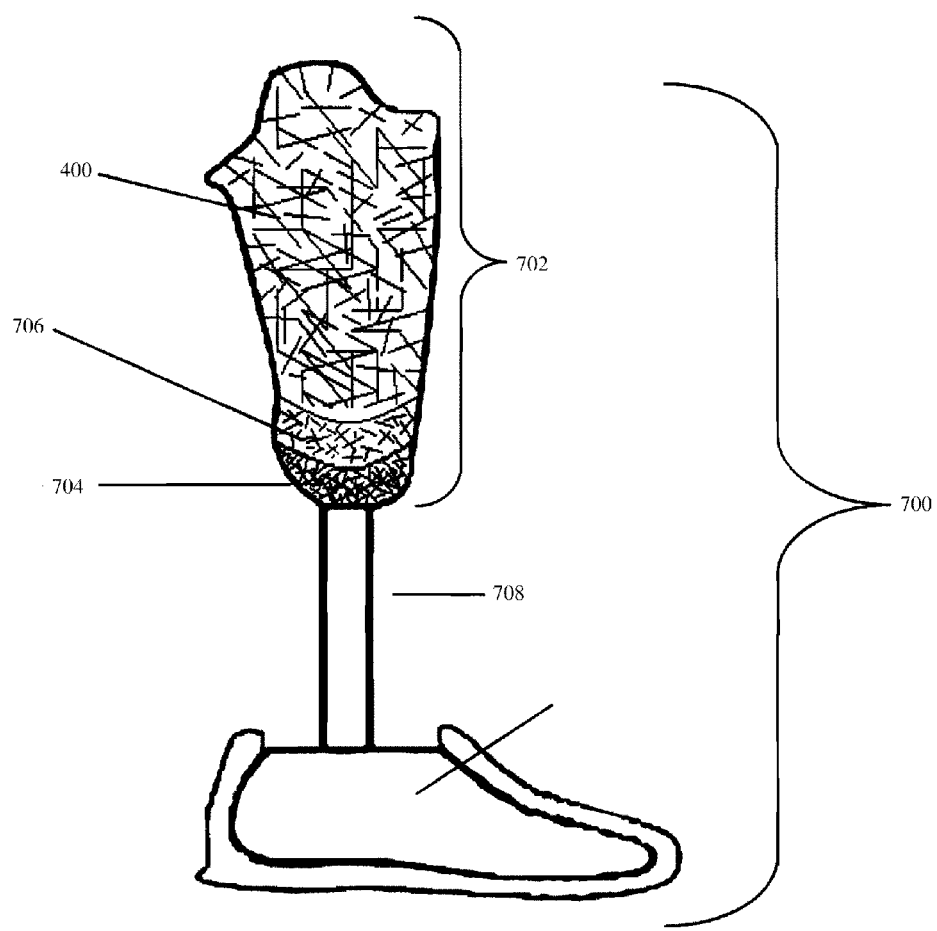
FIG. 7 shows a complete endoskeleton prosthesis.

In FIG. 7, a complete endoskeleton prosthesis (here an endoskeletal prostheses means that a pylon is used as the structural member for weight support between the socket and the prosthetic foot. By contrast an exoskeletal prosthesis relies on fiberglass molded over a wood core for structural integrity) (700) is illustrated. The prosthesis (700) incorporates a prosthetic socket (702) that is vacuum thermoformed from another embodiment of the preferred sheetstock (400). The preferred sheetstock (400) in this embodiment incorporates central layers of the fiber veil (404) that are stacked with several inner veil layers (404) that are circular and central to the preferred sheetstock (400). The density of the veil layers (404) is heaviest in the smaller diameter layer (704). Another layer of fiber veil (706) is larger than the heavier density smaller veil (704) and the larger veil circular layer (706) is of a lighter density or veil weight than the smaller veil (704). The larger (706) veil diameter layer and the smaller diameter veil layer (704) are incorporated into the preferred sheetstock (400) as integral layers.

Once the preferred sheetstock (400) is heated to melt temperature and formed over an appropriate plaster of Paris positive model of the patient's residual limb, the circular central layers of the smaller (704) and larger (706) diameter veil segments are vacuum formed over appropriate prosthetic componentry that allow a connection between the prosthetic socket (702) and the pylon (708) of the prosthesis. The centralized area of increased fiber density in the smaller (704) and larger (706) diameter veils will increase the strength of the high stress connection between the pylon (708) and the prosthetic socket (702).

The proximal area of the prosthetic socket (702) will contain a lower fiber density of preferred sheetstock (400), thus offering some flexibility to the socket to improve comfort to the patient. The proximal area of the prosthetic socket (702), with the lower fiber density will also allow ease post delivery comfort adjustments to the socket through the use of thermal heating and recontouring of the walls of the prosthetic socket (702).

Kydex is a registered trademark of Kydex, LLC. Lexan is a registered trademark for SABIC Innovative Plastics. Vivak is a registered trademark of Sheffield Plastics, Inc.

The invention claimed is:

1. A method of constructing a thermoplastic composite material that has the ability to undergo flow and/or draw during vacuum thermoforming so that it can be drawn from a flat sheet with a first wall thickness into a three dimensional shape with a double horizon bend while maintaining a second wall thickness greater than a preset specification thickness, said method comprising:
    obtaining a plurality of thermoplastic material plies and applying said plies to both faces of at least one original fiber veil ply composed of discontinuous fibers;
    wherein the structure of said at least one original fiber veil ply was maintained by a polymeric binder comprising less than 10% of the weight of the original fiber veil, so that contact points between said discontinuous fibers in said original fiber veil were held together by said polymeric binder, and the remainder of the original fiber veil had a substantially porous structure;
    wherein said polymeric binder is chosen for its ability to dissociate from said contact points during the process of forming said composite material, while preserving the overall original fiber veil orientation of said discontinuous fibers; and
    consolidating said plurality of thermoplastic material plies and said at least one original fiber veil together using a press at a temperature and pressure sufficient to cause said polymeric binder to dissociate from said contact points of said discontinuous fibers, thereby forming at least one fiber veil remnant, and causing said thermoplastic material plies to flow into the porous structure of said original fiber veil, thereby constructing said composite material.

2. The method of claim 1, wherein said at least one original fiber veil is selected based upon the ability of said at least one fiber veil remnant to minimize creep in said composite material after thermoforming while preserving the ability of said composite material to be drawn into a three dimensional shape with a double horizon bend during vacuum thermoforming.

3. The method of claim 1, wherein said polymeric binder is a PVC or polyester binder or other material that dissociates from said fibers during the heat and pressure of forming said composite material;
    said discontinuous fibers are fibers selected from the group consisting of carbon fibers, glass fibers, graphite fibers, polymeric fibers, aramide fibers, plant fibers and nanotechnology fibers; and
    wherein said thermoplastic material is a material selected from the group consisting of Acrylonitrile Butadiene Styrene (ABS) resin, acrylic/PVC thermoplastic sheets (Kydex), polycarbonate resin (Lexan), co-polyester sheets (VIVAK), thermoplastic elastomer (TPE) resins, polyvinyl chloride (PVC) resins, polyolefin resins, polypropylene resins, isotatic polypropylene resins, polystyrene, homopolymer polypropylene, co-polymer polypropylene, polyethylene, and other thermoplastic materials.

4. The method of claim 1, further constructing an orthotic device or a prosthetic device for a patient using said composite material.

5. The method of claim 4, wherein the thickness of at least those thermoplastic material plies surrounding said original fiber veil or veils are chosen so that no discontinuous fibers from said original fiber veil or veils can penetrate past at least the side of the thermoplastic material in contact with the skin of said patient.

6. The method of claim 1, wherein said first wall thickness is between $3/64$ inches and $3/4$ inches, and said preset specification thickness is between 75% to 125% of said first wall thickness.

7. A method of inhibiting creep in an orthotic device or a prosthetic device, said method comprising:
    obtaining a plurality of thermoplastic material plies and applying said plies to both faces of at least one original fiber veil ply composed of discontinuous fibers;
    wherein the structure of said at least one original fiber veil ply was maintained by a polymeric binder comprising less than 10% of the weight of the original fiber veil, so that contact points between said discontinuous fibers in said original fiber veil were held together by said polymeric binder, and the remainder of the original fiber veil had a substantially porous structure;
    wherein said polymeric binder is chosen for its ability to dissociate from said contact points under heat and pressure, while preserving the overall original fiber veil orientation of said discontinuous fibers; and
    consolidating said plurality of thermoplastic material plies and said at least one original fiber veil together using a heat press at a temperature and pressure sufficient to cause said polymeric binder to dissociate from said contact points of said discontinuous fibers, thereby creating at least one fiber veil remnant, and causing said thermoplastic material plies to flow into the porous structure of said original fiber veil, thereby constructing a composite material;
    and vacuum thermoforming said composite material into at least a component of said orthotic device or prosthetic device wherein said component has a three dimensional shape with a double horizon bend.

8. The method of claim 7, wherein said at least one original fiber veil is selected based upon the ability of said at least one fiber veil remnant to inhibit creep in said orthotic device or prosthetic device.

9. The method of claim 7, wherein said polymeric binder is a PVC or polyester binder or other material that dissociates from said fibers during the heat and pressure of forming said composite material;
    said discontinuous fibers are fibers selected from the group consisting of carbon fibers, glass fibers, graphite fibers, polymeric fibers, aramide fibers, plant fibers and nanotechnology fibers; and
    wherein said thermoplastic material is a material selected from the group consisting of Acrylonitrile Butadiene Styrene (ABS) resin, acrylic/PVC thermoplastic sheets (Kydex), polycarbonate resin (Lexan), co-polyester sheets (VIVAK), thermoplastic elastomer (TPE) resins, polyvinyl chloride (PVC) resins, polyolefin resins, polypropylene resins, isotatic polypropylene resins, polystyrene, homopolymer polypropylene, co-polymer polypropylene, polyethylene, and other thermoplastic materials.

10. The method of claim 7, wherein the thickness of at least those thermoplastic material plies surrounding said original fiber veil or veils are chosen so that no discontinuous fibers from said original fiber veil or veils can penetrate past at least the side of the thermoplastic material in contact with the skin of a patient that is wearing said orthotic device.

11. The method of claim 7, in which the material has an ability to self-adhere to itself to act as a selective area of reinforcement, and in which said selective area of reinforcement can also confirm to a three dimensional double horizon shape.

\* \* \* \* \*